United States Patent
Amaral et al.

(10) Patent No.: US 9,003,373 B2
(45) Date of Patent: Apr. 7, 2015

(54) IDENTIFICATION OF PERFORMANCE BOTTLENECKS

(71) Applicant: International Business Machines Corporation, Armonk, NY (US)

(72) Inventors: Jose N. Amaral, Edmonton (CA); Li Ding, North York (CA); Carolina Simoes Gomes, Edmonton (CA); Joran S. C. Siu, Markham (CA)

(73) Assignee: International Business Machines Corporation, Armonk, NY (US)

(*) Notice: Subject to any disclaimer, the term of this patent is extended or adjusted under 35 U.S.C. 154(b) by 68 days.

(21) Appl. No.: 13/732,920

(22) Filed: Jan. 2, 2013

(65) Prior Publication Data

US 2014/0189655 A1     Jul. 3, 2014

(51) Int. Cl.
G06F 9/44         (2006.01)
G06F 11/36        (2006.01)

(52) U.S. Cl.
CPC ............. *G06F 11/3612* (2013.01); *G06F 8/70* (2013.01)

(58) Field of Classification Search
None
See application file for complete search history.

(56) References Cited

U.S. PATENT DOCUMENTS

| | | | |
|---|---|---|---|
| 5,742,811 A * | 4/1998 | Agrawal et al. | 1/1 |
| 5,819,266 A | 10/1998 | Agrawal et al. | |
| 6,826,569 B2 * | 11/2004 | Robertson | 1/1 |
| 7,379,937 B2 | 5/2008 | Inokuchi | |
| 7,735,072 B1 | 6/2010 | Altman et al. | |
| 7,743,370 B1 | 6/2010 | Krablin et al. | |
| 7,926,043 B2 | 4/2011 | Vaswani et al. | |
| 2005/0044073 A1 * | 2/2005 | Inokuchi | 707/3 |
| 2005/0044538 A1 * | 2/2005 | Mantripragada | 717/151 |
| 2009/0177642 A1 | 7/2009 | Chung et al. | |
| 2009/0204554 A1 * | 8/2009 | Koren et al. | 706/12 |
| 2010/0251210 A1 | 9/2010 | Amaral et al. | |

OTHER PUBLICATIONS

Gomes, "Heavyweight pattern mining in attributed flow graphs," 2012, University of Alberta.*
Huan et al., "Efficient Mining of Frequent Subgraphs in the Presence of Isomorphism," IEEE, 2003.*
Jiang, "Frequent Subgraph Mining Algorithms on Weighted Graphs," Apr. 2011, University of Liverpool.*
Cederquist, "Frequent Pattern Mining Among Weighted and Directed Graphs," Case Western Reserve University, Jan. 2009.*
Ranu et al., "GraphSig: A Scalable Approach to Mining Significant Subgraphs in Large Graph Databases," IEEE, 2009.*
Berendt, "The semantics of frequent subgraphs: Mining and navigation pattern analysis," ACM, 2005.*
Ammons, Glen, et al. "Finding and Removing Performance Bottlenecks in Large Systems", ECoop, Jun. 14-18, 2004, LNCS 3086, pp. 172-196.

(Continued)

*Primary Examiner* — Insun Kang
(74) *Attorney, Agent, or Firm* — Cantor Colburn LLP; Peter Wang

(57) ABSTRACT

Embodiments are directed to identifying, by an apparatus comprising a processing device, a pattern in a graph that has a support value greater than a threshold, wherein: the graph comprises a plurality of weighted nodes coupled to one another by one or more weighted edges, and each of the plurality of nodes is associated with at least one weighted attribute.

3 Claims, 9 Drawing Sheets

(56) References Cited

OTHER PUBLICATIONS

Borgwardt, Karsten M., "Pattern Mining in Frequent Dynamic Subgraphs", Proceedings on International Conference on Data Mining, 2006, Hong Kong, p. 1-5.

Zou, Zhaonian, et al.; "Mining Frequent Subgraph Patterns from Uncertain Graph Data"; IEEE Transactions on Knowledge and Data Engineering; vol. 22, No. 9; p. 1203-1218; Sep. 2010.

\* cited by examiner

IDENTIFICATION OF PERFORMANCE BOTTLENECKS

BACKGROUND

The present disclosure relates generally to analysis of program efficiency, and more specifically, to an identification of performance bottlenecks.

A bottleneck is a region of a program (e.g., program code) where significant execution time is spent. Typically, software developers use a profiling tool to collect program execution profiles such as the timing information for each method, routine, process, etc. With the help of such a profiling tool, the developer can sort, e.g., methods by the time spent on them. The methods that consume an amount of time greater than a threshold defined by, e.g., the developer may be treated as bottlenecks. However, the effectiveness of this approach depends on the program's runtime characteristics. Many programs, such as large enterprise commercial applications, do not have obvious bottlenecks. Therefore, their profiles contain a large amount of routines, processes, or methods where the execution time is spent relatively evenly (e.g., within a threshold). This type of profile is often referred to as a "flat profile" because no method dominates the execution time.

Prior technologies fail to totally solve the problem of identifying bottlenecks in flat profiles. For example, prior technologies are unable to detect potential bottlenecks in the form of a sub-graph, i.e., multiple sequential paths breaching from a single entry node. Prior technologies take a long time to complete mining when processing large profile data.

SUMMARY

An embodiment is directed to a method comprising: identifying, by an apparatus comprising a processing device, a pattern in a graph that has a support value greater than a threshold, wherein: the graph comprises a plurality of weighted nodes coupled to one another by one or more weighted edges, and each of the plurality of nodes is associated with at least one weighted attribute.

An embodiment is directed to a computer program product for identifying bottlenecks, the computer program product comprising a computer readable storage medium having computer readable program code embodied therewith, the computer readable program code executable by a computer to perform a method comprising: identifying a pattern in a graph that has a support value greater than a threshold, wherein: the graph comprises a plurality of weighted nodes coupled to one another by one or more weighted edges, and each of the plurality of nodes is associated with at least one weighted attribute.

An embodiment is directed to an apparatus comprising: at least one processor, and memory having instructions stored thereon that, when executed by the at least one processor, cause the apparatus to: construct an execution flow graph (EFG) representative of an execution of a computer program, mine for 0-edge sub-graph patterns in the EFG that have support values that exceed a threshold, insert the 0-edge sub-graph patterns and respective instances of the 0-edge sub-graph patterns into a first data structure and a second data structure, and insert a string representation of the 0-edge sub-graph patterns into a third data structure.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
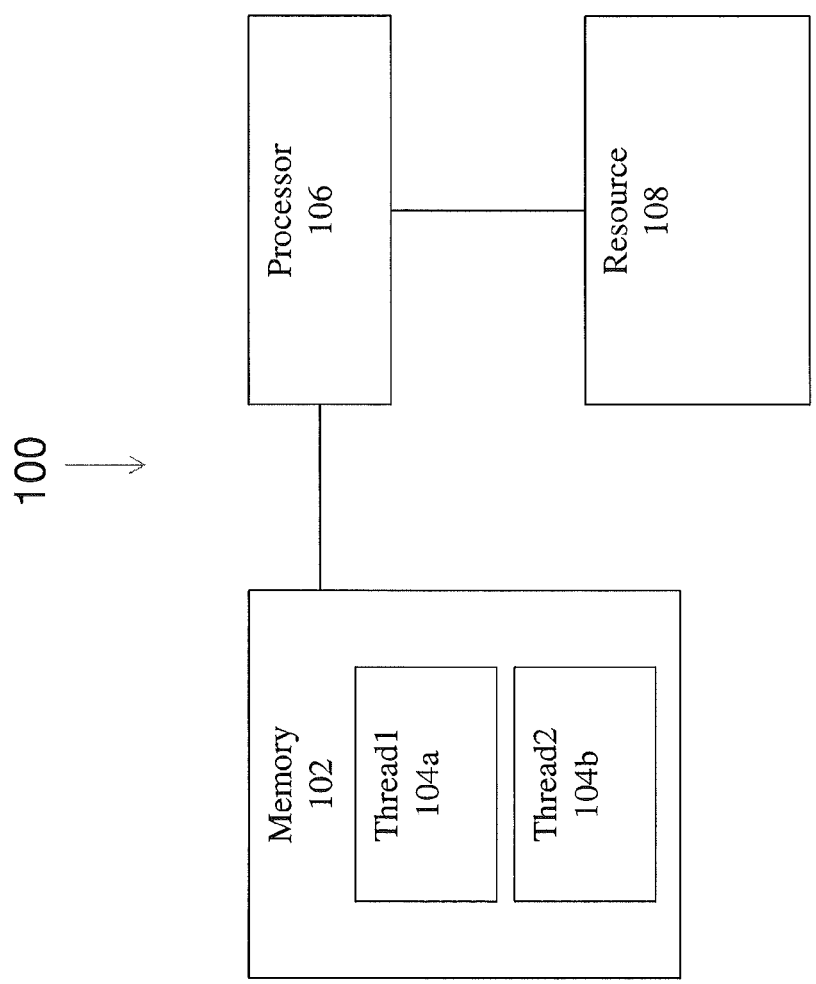
FIG. 1 depicts an exemplary system architecture in accordance with one or more embodiments.

The appendix included towards the end of this disclosure provides definitions for a number of terms that are used throughout herein.

In accordance with various embodiments of the disclosure, supported patterns may be discovered in one or more attributed flow graphs. A flow graph may include weights or values with respect to attributes, nodes, and/or edges. In some embodiments, the discovery may be obtained in connection with an execution of a program, such as a computer program. In some embodiments, a level of support for a pattern may be determined based on an analysis of a frequency associated with one or more nodes and/or edges.

In some embodiments, execution patterns (e.g., frequent execution patterns) may be identified as potential or candidate performance bottlenecks in the form of sub-graphs.

In some embodiments, a mining technique (e.g., a sub-graph mining technique) may be applied on program execution profiles (e.g., flat program execution profiles) represented as a set of execution flow graphs (EFGs).

In some embodiments, the types of patterns found may be extended from sequential patterns only (found in sub-paths of EFGs) to patterns composed of multiple paths (found in sub-graphs of EFGs).

In some embodiments, a labeling system may be constructed to uniquely identify sub-graphs.

In some embodiments, pattern registration may be used to solve pattern growth challenge(s). For example, pattern registration techniques may be used to keep or maintain a list of where nodes in a graph occur or appear for purposes of pattern expansion. Such a list may be used to expand, e.g., a single node to two nodes by facilitating a search of nodes referenced in the list. In this manner, each node might not be examined repeatedly during a growth or expansion process. For example, the list may provide for merely checking the neighbors of nodes referenced in the list.

In some embodiments, a mapping may be constructed from execution patterns to instances in application code. In some embodiments, one or more execution patterns and/or the instance(s) in the application code responsible for generating the execution pattern(s) may be provided as output. In some embodiments, a compiler may use the output to determine whether attributes or a particular flow is desirable or appropriate. In some embodiments, the compiler may use the output to obtain a more efficient program realization or execution sequence.

In some embodiments, frequent sub-graph and/or sequential execution patterns may be identified as potential performance bottlenecks. Aspects of the disclosure may improve the speed or efficiency of mining relative to other techniques via the use of a pattern registration technique and via the use and identification of characteristics of an EFG. Aspects of the disclosure may be used by, e.g., software developers. In some embodiments, program code that is an instance of a discovered pattern may be located using, e.g., a mapping system.

It is noted that various connections are set forth between elements in the following description and in the drawings. It is noted that these connections in general and, unless specified otherwise, may be direct or indirect and that this specification is not intended to be limiting in this respect. In this respect, a coupling of two entities may refer to a direct connection or an indirect connection, and may include an intervening entity.

Referring to FIG. 1, an exemplary system architecture 100 is shown. The architecture 100 is shown as including a memory 102. The memory 102 may store executable instructions. The executable instructions may be stored or organized in any manner. As an example, at least a portion of the instructions are shown in FIG. 1 as being associated with a first thread 104a and a second thread 104b, although any number of threads may be included. The instructions stored in the memory 102 may be executed by one or more processors, such as a processor 106.

The threads 104a and 104b may be associated with a resource 108. For example, the resource 108 may include one or more pages, which may be organized as one or more blocks, objects, fields, strings, elements, or the like. The threads 104a and 104b may access the resource 108 concurrently (e.g., concurrently in terms of time or space), such that the resource 108 may be, or include, a shared resource. In some embodiments, the resource 108 may include one or more input/output (I/O) devices, such as a keyboard, a mouse, a button, a switch, a trackball, a display screen, etc.

In some embodiments, one or more of the entities shown in FIG. 1 may be replicated. For example, in some systems, multiple computing devices may access the resource 108. In some embodiments, the computing devices may be coupled to one another via one or more networks, such as the Internet.

Figure 2:
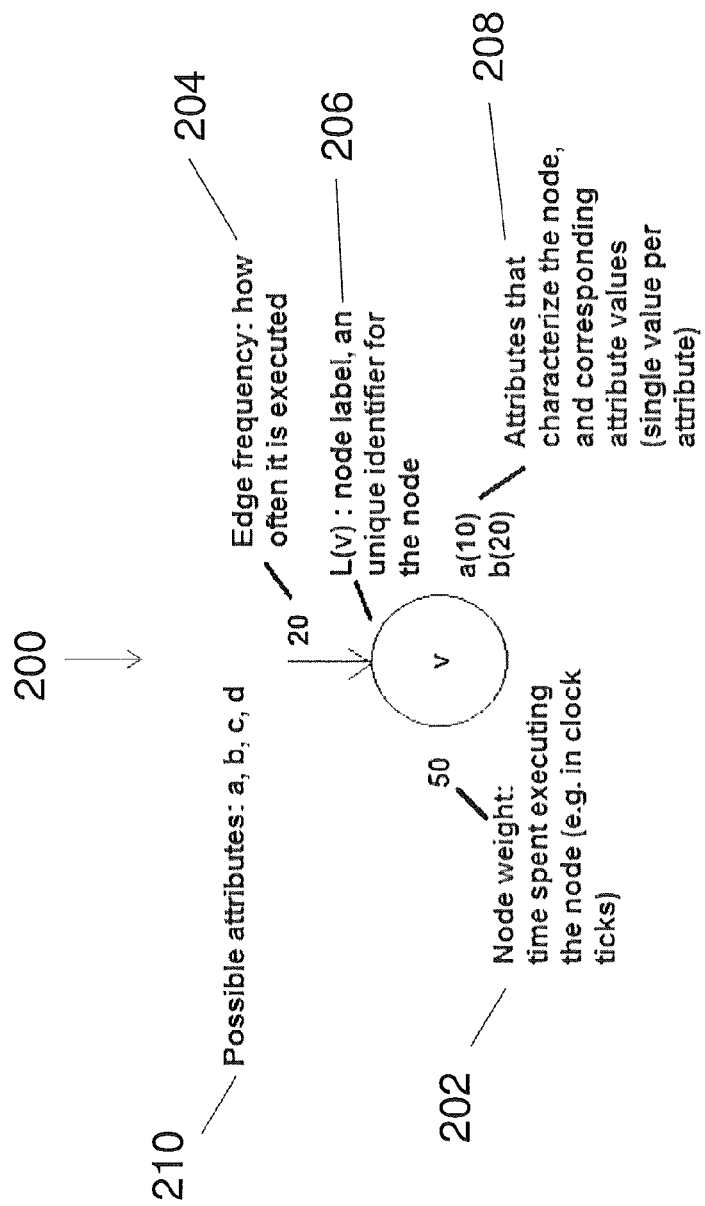
FIG. 2 depicts an exemplary node in accordance with one or more embodiments.

Turning now to FIG. 2, an example of a node 200 is shown. The node 200 may be associated with an execution flow graph (EFG).

The node 200 may include, or be associated with, one or more characteristics or parameters. For example, a parameter 202 may be indicative of a weight associated with the node 200. The weight 202 may reflect time spent executing the node, optionally in terms of clock cycles or ticks. In the example shown in FIG. 2, the node 200 has a weight 202 equal to fifty (50).

A parameter 204 may be indicative of an edge frequency associated with the node. The edge frequency 204 may be indicative of how often the node 200 is executed. In the context of an EFG, the edge frequency 204 may be indicative of how many times the node 200 is entered from one or more other nodes.

A parameter 206 may serve as a label for the node 200. The label 206 may include a unique identifier for the node 200. The label 206 may be represented in different formats. For example, string or alphanumeric formats may be used for the label 206 in some embodiments. In the example shown in FIG. 2, the label of node 200 is a symbol referred to by the notation 'L(v)'.

The node 200 may be associated with one or more attributes 208. The attributes may be used to characterize the node 200 and may include one or more values. In the example shown in FIG. 2, the node 200 is associated with attributes 208 'a' and 'b', where the attribute 'a' has a value of ten (10) and the attribute 'b' has a value of twenty (20). The attributes 208 may be selected from a set or pool of attributes 210. In the example shown in FIG. 2, the set of attributes 210 includes attributes 'a', 'b', 'c', and 'd'.

Figure 3:
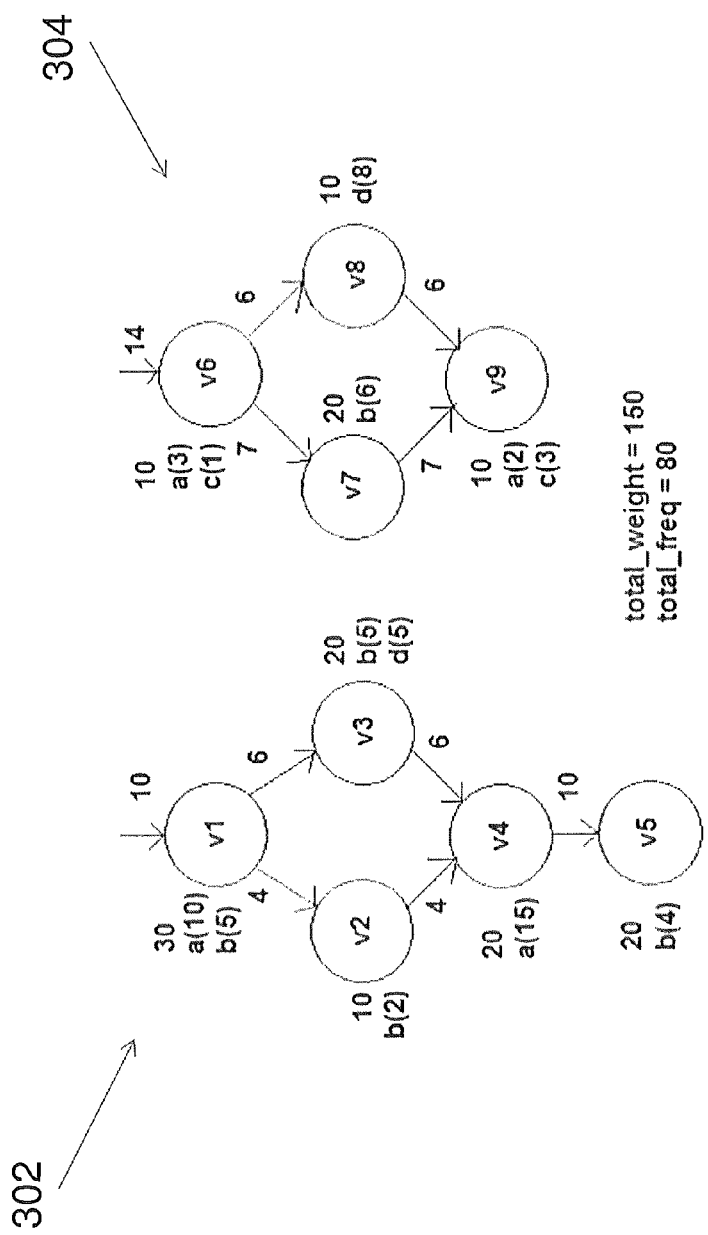
FIG. 3 depicts an exemplary modeling of a dataset as a flow graph in accordance with one or more embodiments.

FIG. 3 depicts an exemplary dataset of EFGs. Specifically, FIG. 3 depicts an EFG 302 and an EFG 304. The EFG 302 may include nodes v1, v2, v3, v4, and v5. The node v1 may be coupled to the node v2. The node v1 may be coupled to the node v3. The node v2 may be coupled to the node v4. The node v3 may be coupled to the node v4. The node v4 may be coupled to the node v5. The coupling of the nodes v1-v5 may be based on one or more edges (e.g., edge 204 of FIG. 2), with frequencies as shown in FIG. 3.

The node v1 may have 'a' and 'b' as attributes. The node v2 may have 'b' as an attribute. The node v3 may have 'b' and 'd' as attributes. The node v4 may have 'a' as an attribute. The node v5 may have 'b' as an attribute. The values for the attributes with respect to the nodes v1-v5 may be as shown in parentheses FIG. 3.

The EFG 304 may include nodes v6, v7, v8, and v9. The node v6 may be coupled to the node v7. The node v6 may be coupled to the node v8. The node v7 may be coupled to the node v9. The node v8 may be coupled to the node v9. The coupling of the nodes v6-v9 may be based on one or more edges (e.g., edge 204 of FIG. 2), with frequencies as shown in FIG. 3.

The node v6 may have 'a' and 'c' as attributes. The node v7 may have 'b' as an attribute. The node v8 may have 'd' as an attribute. The node v9 may have 'a' and 'c' as attributes. The values for the attributes with respect to the nodes v6-v9 may be as shown in parentheses in FIG. 3.

Taking the EFGs 302 and 304 together, a total weight may be calculated as a sum of weights of all the nodes. Thus, the total weight for the nodes v1-v9 may be equal to: 30+10+20+20+20+10+20+10+10=150. Similarly, a total frequency may be calculated as a sum of the frequencies of all the edges. Thus, the total frequency for the EFGs 302 and 304 may be equal to: 10+4+6+4+6+10+14+7+6+7+6=80.

The EFGs 302 and 304 may include a number of sub-graph patterns. A sub-graph pattern may be sequential (represented as a sub-path of the EFG) or may contain split and join nodes. A sub-graph pattern may be deemed frequent if its support value exceeds a threshold. In some embodiments, the threshold may be defined or selected by a user. The support value of a pattern may correspond to a maximum of its time support (e.g., weight) and frequency.

Figure 4:
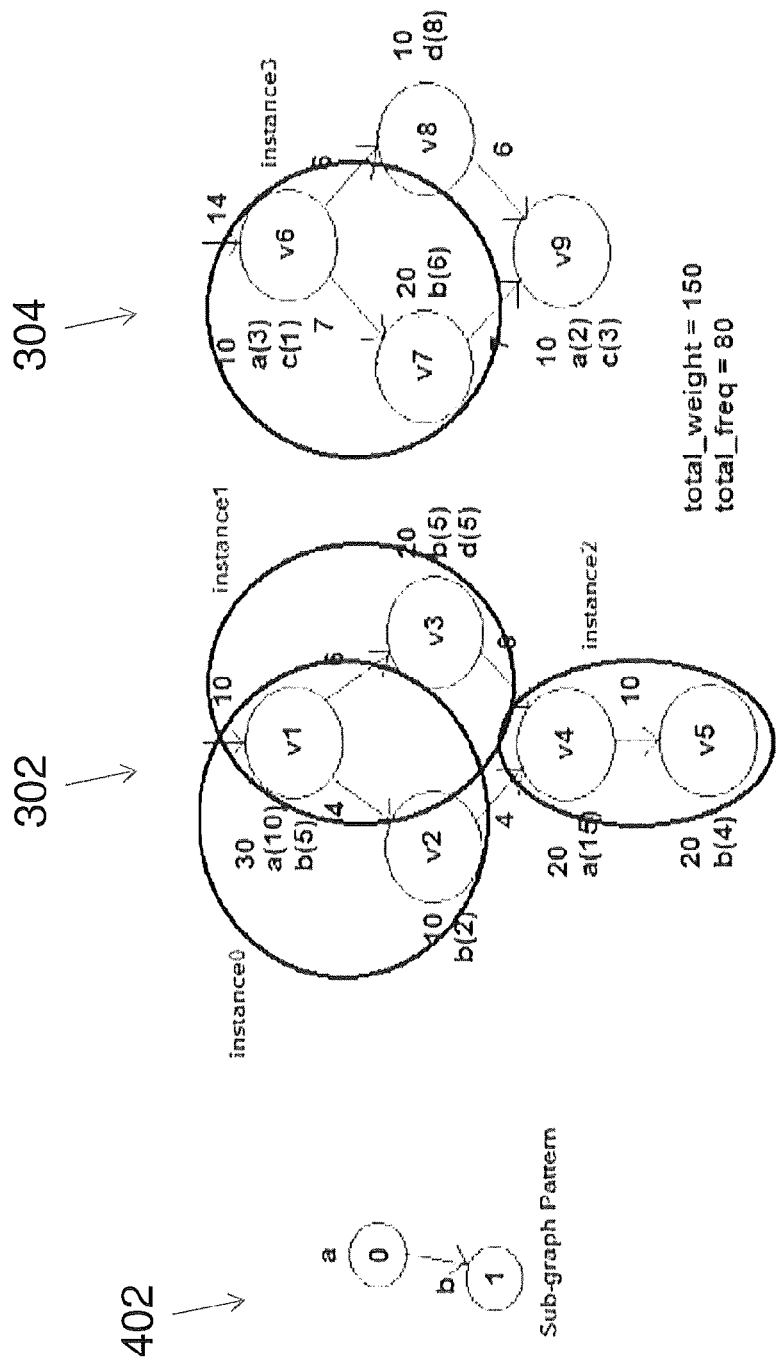
FIG. 4 depicts exemplary instances of a sub-graph pattern in accordance with one or more embodiments.

Turning now to FIG. 4, an example of a sub-graph pattern 402 is shown. The sub-graph pattern 402 has attributes {a, b}. A mining process may be applied to identify instances in the dataset of EFGs 302 and 304 that include the sub-graph pattern 402. As shown in FIG. 4, four instances (instance0, instance1, instance2, and instance3) may be identified in the EFGs 302 and 304 as including the sub-graph pattern 402.

In order to calculate S_w(g), the time (node weight) support value of the sub-graph pattern 402, the weight of the attribute with minimum weight may be selected in each of the instances of the sub-graph pattern 402 found in the dataset. According to the example shown in FIG. 4, that would be: min_w(instance0)=2 (from b), min_w(instance1)=5 (from b), min_w(instance2)=4 (from b), min_w(instance3)=3 (from a).

It is noted that, in instance3 of the sub-graph pattern 402, the actual minimum attribute weight is 1, belonging to attribute 'c'. However, 'c' is not part of the attributes of the sub-graph pattern 402, and as a consequence, it is not included in the calculation. After obtaining the minimum attribute weights for every instance of the sub-graph pattern 402, they may be added to obtain S_w(g):

$$S\_w(g)=\min\_w(\text{instance0})+\min\_w(\text{instance1})+\min\_w(\text{instance2})+\min\_w(\text{instance3})=2+5+4+3=14.$$

Likewise, to obtain S_f(g) the minimum edge frequencies of all instances of the sub-graph pattern 402 may be added:

$$\min\_f(\text{instance0})=4, \min\_f(\text{instance1})=6, \min\_f(\text{instance2})=10, \min\_f(\text{instance3})=7.$$

$$S\_f(g)=\min\_f(\text{instance0})+\min\_f(\text{instance1})+\min\_f(\text{instance2})+\min\_f(\text{instance3})=4+6+10+7=27.$$

The final support value S_m(g) of the sub-graph pattern 402 may be calculated as the maximum between S_w(g) and S_f(g): S_m(g)=max {S_w(g), S_f(g)}. In the example shown in FIG. 4, the final support value S_m(g) would be equal to S_f(g)=27.

In some embodiments, one or more of the time (node weight) support value S_w(g), the frequency (edge weight) support value S_f(g), and the final support value S_m(g) may be normalized to facilitate comparison with, e.g., a threshold value as described further below.

Figure 5:
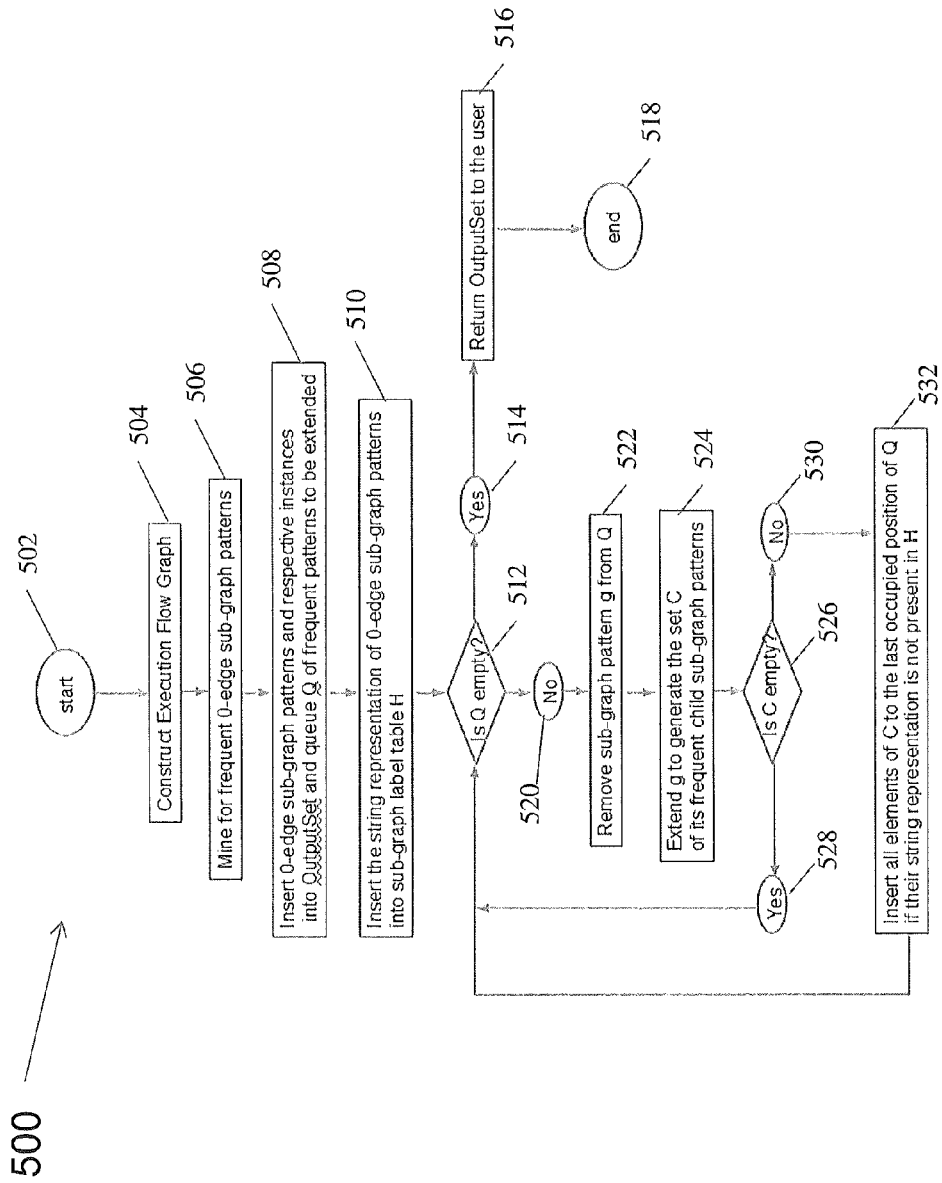
FIG. 5 depicts an exemplary flow chart of a method in accordance with one or more embodiments.

Turning now to FIG. 5, a flow graph of a method 500 is shown. The method 500 may be used to generate and provide an output set of frequent sub-graph patterns associated with one or more dataset EFGs.

The method 500 may start in block 502, and flow may proceed from block 502 to block 504. In block 504, one or more EFGs may be constructed. For example, a set of EFGs, denoted as DS, may be constructed from profile data.

From block 504, flow may proceed to block 506. In block 506, mining for 0-edge sub-graph patterns may be performed. These patterns in the dataset may satisfy the following conditions: 1) are composed of a single node each, 2) have a combination of one or more of the attributes present in InitialAttributeList, and 3) are frequent. The generation of such patterns may work by considering that every node created may carry a distinct set of attributes. Initially, the attributes may come from InitialAttributeList, which may be a list that contains distinct attributes that are selected as being of interest. A node may be created for every distinct attribute in the list. Then the nodes may be mined using a Sub-graph pattern mining technique (described further below). Those nodes that are frequent may have their attributes combined to generate additional nodes with sets of two distinct attributes each. The new nodes may also be mined for, and those that are found to be frequent are used to generate other nodes with sets of three distinct attributes each, and so on, until no nodes with a certain size of attribute set (in number of attributes) are frequent.

After 0-generation of patterns are discovered, the method 500 may populate one or more data structures to keep track of these patterns and prepare for pattern growth. For example, in block 508 the 0-edge sub-graph patterns and respective instances may be inserted into a data structure OutputSet. OutputSet may correspond to a set of frequent sub-graph patterns identified by the method 500. As part of block 508, the 0-edge sub-graph patterns and respective instances may be inserted into the end of Q. Q may be a data structure, such as a queue, that holds frequent sub-graph patterns that may be extended.

In block 510, string representations of the 0-edge sub-graph patterns may be inserted into a frequent sub-graph pattern label table H. H may correspond to a data structure, such as a hash-table, that holds the string representation (described further below) of frequent sub-graph patterns. H may be used to lookup whether a pattern has already been mined for.

Distinct attributes present in the 0-generation patterns may be saved in a CurrentAttributeList. Such attributes may be used to compose candidate patterns for the next generation of patterns (e.g., 1-generation).

Blocks 514-532 may be indicative of sub-graph pattern growth activity. One or more of the block 514-532 may be used to extend one or more patterns in Q to generate child sub-graph patterns.

As an example, a first pattern in Q, which may be referred to as g, may be selected (e.g., based on a flow from block 512 to block 520, and from block 520 to block 522). An extension of g (e.g., block 524) may be obtained by generating candidate patterns that are spanned by attaching to g a new node, connected to g by a new edge. In order to do that, a choice may be made, among the nodes in g, of a pivot node to which the new node will be connected, and then the new node and edge may be generated. Every node of g may be used once as a pivot node for candidate generation. New nodes may be generated similarly for the 0-edge sub-graphs. Instead of InitialAttributeList, however, CurrentAttributeList may be used. In order to create a candidate sub-graph pattern, each attribute in CurrentAttributeList may be associated to a new node, which may be connected to g to generate new candidate patterns g'. Every new candidate pattern g' may then be mined for in the DS using a sub-graph pattern technique (described further below). If g' is frequent, g' may be inserted into a set C of frequent children of g. Otherwise, g' may be discarded.

When all frequent child patterns of g that contain one attribute each have been placed into C, their attribute sets may be combined to generate new nodes that have two distinct attributes each. The new nodes may then be connected to g and the spanned candidate patterns may be mined for in the dataset. Those that are frequent may be placed into C (e.g., block 524), and their attribute sets of size two (in number of attributes) may again be combined to generate nodes with three attributes each. This process may repeat, with increments in the number of distinct attributes associated with the new nodes, until no more candidate patterns are found to be frequent.

The other way by which sub-graph pattern g may be extended (e.g., block 524) is the addition of a new edge that connects two already existing nodes in g. All nodes of g may be used as a pivot node and target node for such edge additions, but there might be no repeated edges in the new candidate sub-graph patterns generated by the additions. Every candidate pattern generated may be mined for in the dataset, and if frequent, may be inserted into C. Otherwise, the candidate may be discarded.

Every time a child sub-graph pattern is generated, it may be mined for in the dataset. Those children of g that are frequent, if any, may be inserted into the end of Q, into H, and then placed into OutputSet, along with identifiers for all the instances of such children (e.g., block 532). Pattern g may then be removed from Q. The sub-graph pattern growth process may be repeated by taking the next pattern in Q. The child patterns of g might only be extended after all sub-graph patterns that have the same size as g are, themselves, extended. In other words, the patterns in the (k+1)-generation might only be extended after all patterns in the k-generation are extended. When all patterns in the k-generation are extended, CurrentAttributeList may be emptied of its contents, which were all the distinct attributes present in the patterns of the (k−1)-generation, and filled with all the distinct attributes found in the patterns of the k-generation that has just been processed. CurrentAttributeList may serve to compose the candidate patterns for the (k+1)-generation.

When Q is finally empty (e.g., the "Yes" block 514 out of decision block 512 executes) and the loop associated with blocks 512, 520, 522, 524, 526, 528, 530, and 532 is finished, the method 500 has as its output all patterns in OutputSet (e.g., block 516) and the identifiers of each of the instances where the patterns were found. The fact that OutputSet includes information on which patterns are frequent and where in the dataset the instances of such patterns are located, may be used or exploited by one or more entities, such as a compiler. The method 500 may then end at block 518.

Having described the method 500, additional detail is provided below regarding the sub-graph pattern mining technique that may be used.

Sub-graph pattern mining may be used to search for instances of a candidate pattern g in the DS. In order to improve performance, a mining of redundant candidate patterns in the dataset may be prevented. Before the mining starts, a verification or check may be performed to confirm that g has not been previously searched for and found in the dataset. If it has, then searching for g would be redundant.

Redundant candidate pattern detection decreases the number of candidate patterns that the method 500 needs to search. Redundant patterns may be generated because the growth of different sub-graph patterns may lead to one or more of their child patterns being isomorphic to each other.

In order to quickly detect if two sub-graphs are isomorphic to each other, a sub-graph pattern labeling system may be used. Every sub-graph pattern may be represented as a string of characters and the strings for the two sub-graphs may be compared. If the strings are the same, the sub-graphs may be deemed isomorphic.

In some embodiments, the string format used to represent a sub-graph of n edges may take the form of:

(edge_0)(edge_1) . . . (edge_n), with each edge being represented as:

([from-node][to-node]), and each node v may be represented as:

L(v): (attr_1)(attr_2) . . . (attr_k) . . . (attr_m), with attr_k being the k-th attribute of node v, $1 <= k <= m$ and $m >= 1$.

When checking for sub-graph isomorphism using strings, a necessary condition for the isomorphism to be confirmed may be that there should be a direct correspondence between the identifier labels L(v) of every node v of the two sub-graphs being compared. This condition may require that labels be given in a consistent fashion. For example, if two sub-graphs are isomorphic, even if their nodes are created in different order, their correspondent nodes may have the same labels. For this to occur, the label of a sub-graph pattern node may be defined as the order in which the node is visited during a depth-first traversal of the sub-graph.

The mining procedure may use the described string representation of sub-graphs to detect redundant candidate patterns by using H, which may hold the string representations of all frequent sub-graphs identified up to that point in the mining process. Every candidate pattern, before being mined for, may have its string representation looked up in H. If an identical string already exists in H, the candidate pattern is redundant and may be discarded. Otherwise, the mining proceeds. In some embodiments, instead of storing in H only the string representations of frequent sub-graphs, all candidate sub-graphs ever generated and tested could be stored. Storing all such candidate sub-graphs ever generated and tested might be impractical when mining large datasets with many possible patterns because H might consume too much memory.

The mining procedure of a candidate sub-graph pattern g' may be state-based and work separately on each EFG of the dataset. For each EFG G, an attempt may be made to find all existing maps, if any, between nodes and edges in g' and nodes and edges in G. In other words, an attempt may be made to locate instances of g' in G. In order to build such maps, pairs {v_g', v_G} of candidate nodes coming from g' and G, respectively, may be selected. The choice may be made by iterating over the node sets of both g' and G and simply picking the first pair that has not been tested yet. A pair may be added to a map if it is feasible, which means it may follow two rules: 1) attributes of v_G should be exactly the same as or a superset of attributes in v_g', and 2) edge structure between v_g' and v_G should be maintained. This may imply checking all incoming and outgoing edges of both nodes and making sure the other nodes to which such edges connect obey the preceding first rule.

If the sub-graph being searched for is a 0-edge sub-graph, the procedure might only end when all nodes in DS have been visited. Otherwise, the procedure may end when it has checked (in a manner that will be described later on) all elements of the list Instances(g, G) for every G in DS, where g is the parent sub-graph of g'. As the nodes of DS or elements of Instances(g, G) are visited, goal states and/or dead-end states may be found.

A goal state may be defined as having all nodes in g' mapped to a set of (potentially non-unique) nodes in G. A dead-end state may be a partial mapping between nodes in g' and G, where no additional pair of nodes from g' and G can be found in order to proceed with the mapping construction. Every time a goal state is reached, the support values S_w and S_f of g' may be updated with the support values of the located instance, G may be added to DS(g') and the located instance of g' may be added to Instances(g', G).

As described above, when g' is a k-edge sub-graph, with k>0, the mining procedure might only end when all elements in the list Instances(g, G) have been visited. An advantage of keeping Instances(g, G) may be the knowledge that the instances of g' are necessarily a subset of the instances of its parent sub-graph g. As a consequence, the instances of g can be used as partial maps for g'. It may also be known that g' differs from g only by an extra edge or an extra edge and node. The extra edge, during the growth process of g, may be connected to a node in g (the pivot node). Therefore, for every element in Instance(g', G), the node pivot_G that is the correspondent, in G, to the pivot node may be selected. A check may be performed to determine if the extra edge or extra edge and node from g' have their correspondents among those edges and nodes that are connected to pivot_G. If the correspondence exists, an instance has been found.

The technique described above may provide for using the instances of a sub-graph pattern as starting points when mining for its child sub-graph patterns (instead of visiting every node in the dataset of EFGs). The technique may be referred to as sub-graph pattern registration.

Figure 6:
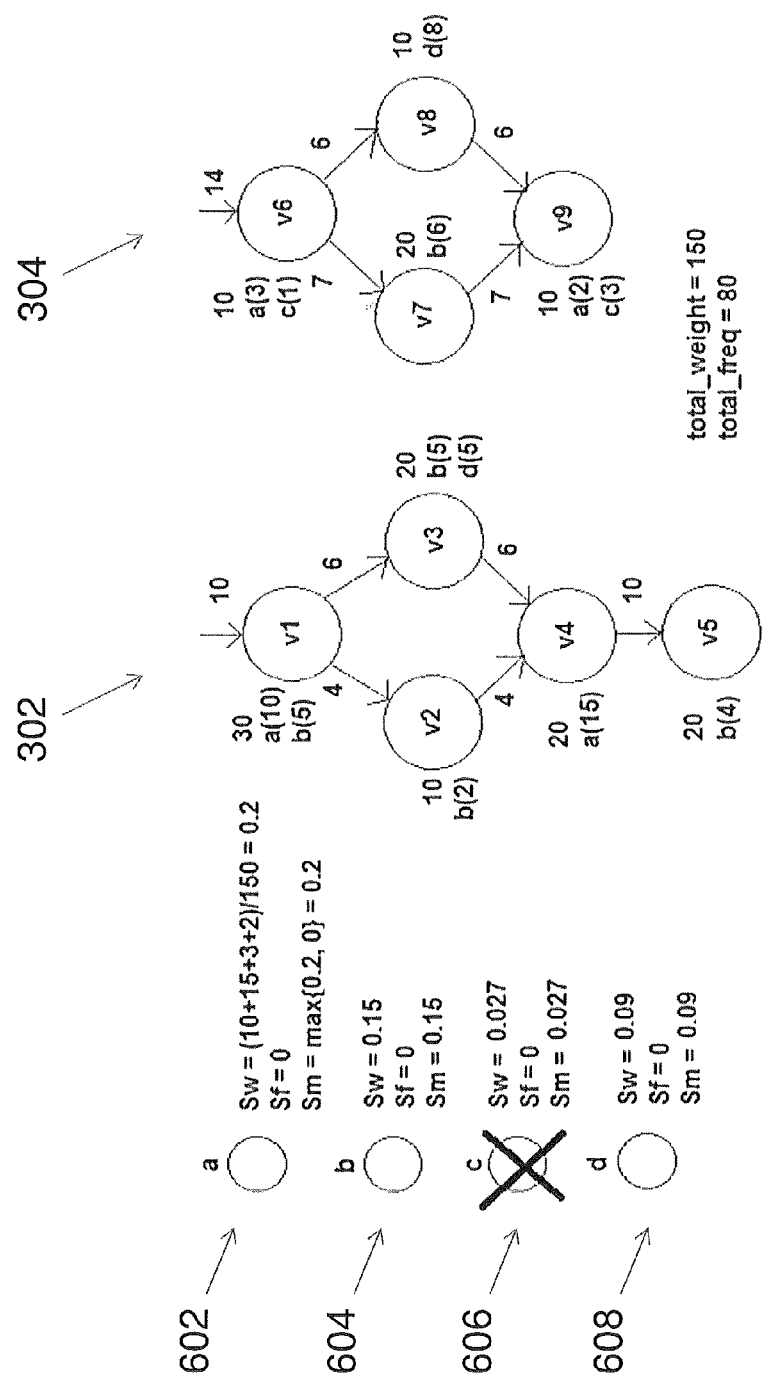
FIG. 6 depicts exemplary intermediate states in the process of mining sub-graph patterns in accordance with one or more embodiments.

FIG. 6 is exemplary of the process of mining for sub-graph patterns in accordance with one or more embodiments. In FIG. 6, 0-edge sub-graph patterns that have a single attribute associated to them are identified. Each of the nodes 602, 604, 606, and 608 has an attribute associated with it. For example, the node 602 has attribute 'a' associated with it. The node 604 has attribute 'b' associated with it. The node 606 has attribute 'c' associated with it. The node 608 has attribute 'd' associated with it. The attributes 'a', 'b', 'c', and 'd' may be elements or members of the InitialAttributeList.

As shown in FIG. 6, support values Sw, Sf, and Sm may be calculated for each of the nodes 602-608. The node 606 is shown with a large/heavy 'X' through it to indicate that the node 606 is determined to not be frequent, as its support value of Sm=0.027 may be less than a minimum support value of MinSup=0.03 in this example. Conversely, the support values Sm for the nodes 602, 604, and 608 are greater than or equal to MinSup=0.03 in this example. As such, the nodes 602, 604, and 608 may be determined to be frequent.

Figure 7:
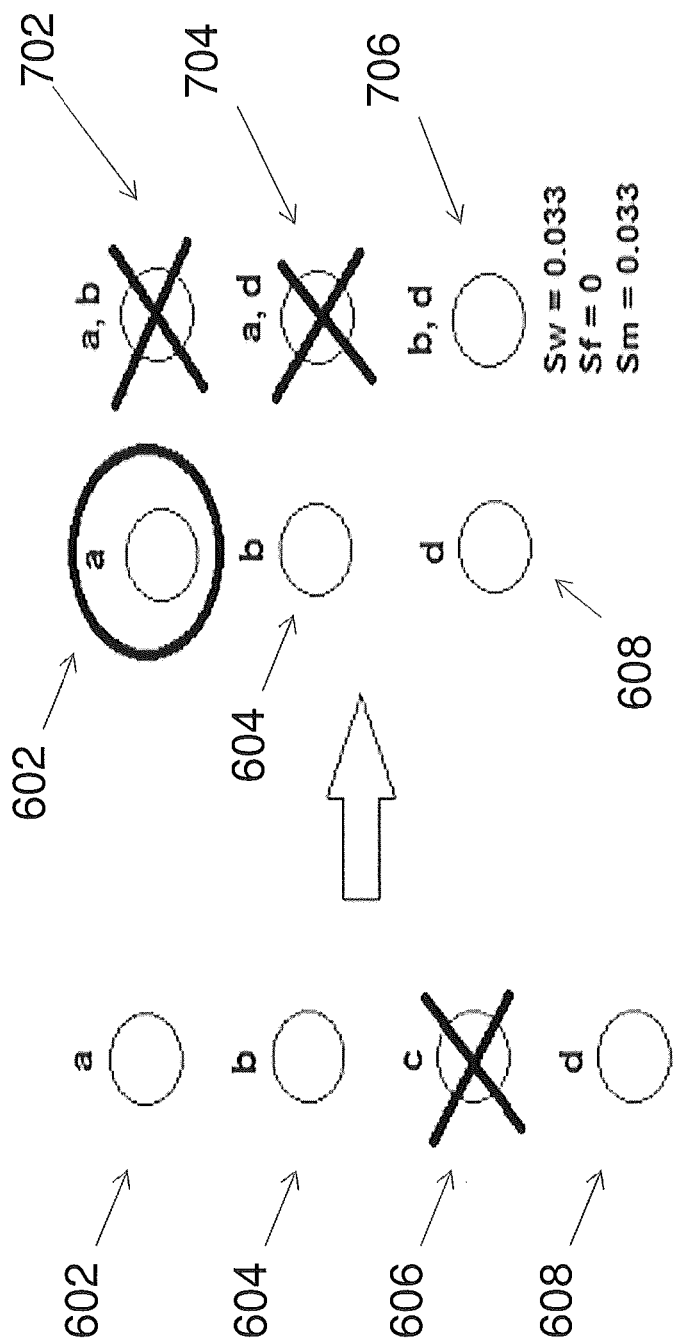
FIG. 7 depicts exemplary results of the process of mining sub-graph patterns, including nodes with two attributes, in accordance with one or more embodiments.

FIG. 7 depicts a resumption of the exemplary mining process for 0-edge sub-graph patterns relative to FIG. 6. Those patterns that are frequent in FIG. 6 (e.g., patterns associated with nodes 602, 604, and 608) may have their attribute sets of k attributes (where k=1 in this example) combined to form 0-edge sub-graph patterns with attribute sets of (k+1) attributes. Thus, patterns associated with attributes {a, b}, {a, d}, and {b, d} may be examined as candidate frequent sub-graph patterns as reflected by nodes 702, 704, and 706, respectively. The new patterns may be mined for in the dataset, but none of them except the one with attribute set {b, d} (reflected by the node 706) is frequent in this example. In this example, there is no way to proceed with the attribute set combination process, so the generation of 0-edge sub-graph patterns may complete.

Figure 8:
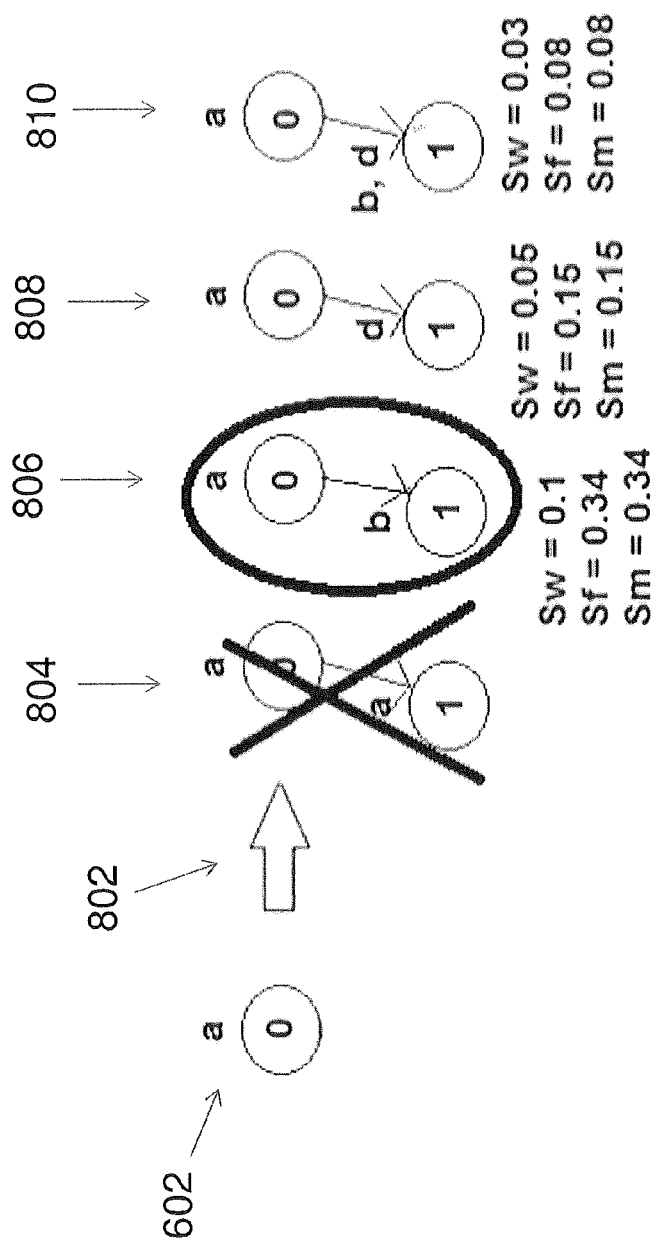
FIG. 8 depicts an exemplary pattern-growth for a sub-graph pattern in accordance with one or more embodiments.

One or more of the four frequent 0-edge sub-graph patterns (reflected by the nodes 602, 604, 608, and 706 in FIG. 7) may be grown to generate 1-edge sub-graph patterns. For example, FIG. 8 reflects the growth of the node 602 (which is circled in FIG. 7, and is given a node label of '0' in FIG. 8). In FIG. 8, the spanned child patterns incorporating the node '0' and candidate nodes labeled '1' with attributes as shown are on the right-hand side of arrow 802. The child pattern 804 that is crossed might not be found in the dataset by sub-graph pattern mining. The child patterns 806, 808, and 810 may be found in the dataset, and their support values may be as shown. The child patterns 806, 808, and 810 may be frequent, and inserted into Q to be extended after all 0-edge sub-graph patterns are themselves extended and have their children also inserted into Q.

Figure 9:
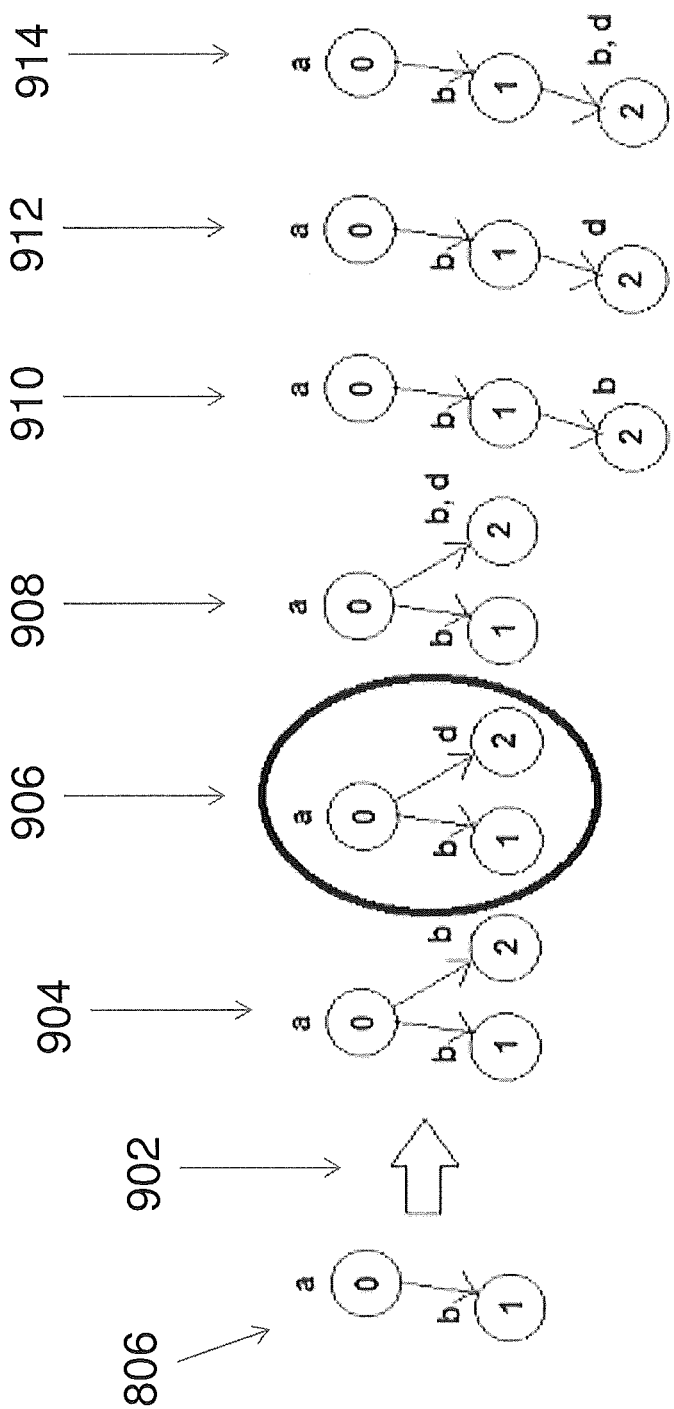
FIG. 9 depicts an exemplary pattern-growth for a sub-graph pattern in accordance with one or more embodiments.

The 1-edge sub-patterns 806, 808, and 810 may in turn be grown or extended. For example, the pattern 806 (which is circled in FIG. 8) may be removed from Q and extended to span multiple 2-edge sub-graphs as shown in FIG. 9. Patterns 904, 906, and 908 on the right-hand side of arrow 902 in FIG. 9 may have as a pivot node the node with label 0 with respect to candidate nodes labeled '2'. Patterns 910, 912, and 914 may have as a pivot node the node with label 1 with respect to candidate nodes labeled '2'. The pattern 906 in FIG. 9 may also appear when the pattern 808 of FIG. 8 is grown. The second time that the pattern 906 appears (e.g., when extending or growing the pattern 808), it might not be extended because the redundancy may be detected.

Embodiments of the disclosure may be tied to particular machines. For example, in some embodiments a computing device may be configured to discover supported patterns in flow graphs that have weights on attributes, nodes, or edges. The computing device may be configured to identify potential performance bottlenecks in connection with, e.g., an execution of a program. In some embodiments, the computing device may be configured to determine a frequency associated with one or more nodes or edges.

In some embodiments various functions or acts may take place at a given location and/or in connection with the operation of one or more apparatuses or systems. In some embodiments, a portion of a given function or act may be performed at a first device or location, and the remainder of the function or act may be performed at one or more additional devices or locations.

In some embodiments, an apparatus or system may comprise at least one processor, and memory storing instructions that, when executed by the at least one processor, cause the apparatus or system to perform one or more methodological acts as described herein. In some embodiments, the memory may store data, such as one or more structures, metadata, lines, tags, blocks, strings, etc.

As will be appreciated by one skilled in the art, aspects of this disclosure may be embodied as a system, method or computer program product. Accordingly, aspects of the present disclosure may take the form of an entirely hardware embodiment, an entirely software embodiment (including firmware, resident software, micro-code, etc.) or as embodiments combining software and hardware aspects that may all generally be referred to herein as a "circuit," "module" or "system." Furthermore, aspects of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific example (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming language, including an object oriented programming language such as Java, Smalltalk, C++ or the like and conventional procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There may be many variations to the diagram or the steps (or operations) described therein without departing from the spirit of the disclosure. For instance, the steps may be performed in a differing order or steps may be added, deleted or modified. All of these variations are considered a part of the disclosure.

It will be understood that those skilled in the art, both now and in the future, may make various improvements and enhancements which fall within the scope of the claims which follow.

APPENDIX

Definitions k-edge sub-graph: A sub-graph composed of k edges. A 0-edge sub-graph is simply a single node.

Size of a sub-graph pattern: The number of edges the sub-graph has.

DS: Dataset of EFGs to be mined.

DS(g): Set of EFGs where instances of a sub-graph pattern g have been found.

$S\_w(g)$: The minimum attribute weight of an instance of a sub-graph pattern g, summed up over all instances of g.

$S\_f(g)$: The minimum edge weight of an instance of a sub-graph pattern g, summed up over all instances of g.

$S\_m(g)$: The support value of a sub-graph pattern g, defined as the maximum between $S\_w(g)$ and $S\_f(g)$.

MinSup: Minimum support value to be compared against $S\_m(g)$ when it is calculated for a candidate pattern g.

Frequent sub-graph pattern: A sub-graph that has its support value $S\_m$ higher than MinSup.

Pattern-growth or pattern extension: The process of adding to a sub-graph pattern either a single edge connecting two existing nodes of the pattern, or an edge connecting an existing node of the pattern to a new node, in order to generate a new sub-graph pattern. The extended sub-graph pattern is the parent sub-graph, and the pattern generated from the growth process is the child sub-graph.

Parent sub-graph pattern: A sub-graph pattern that is extended to generate other sub-graph patterns.

Child sub-graph pattern: A sub-graph pattern that has been generated by the extension of another sub-graph pattern (its parent).

From-node: Considering a directed edge connecting two nodes, it is the node that has the edge directed from it.

To-node: Considering a directed edge connecting two nodes, it is the node that has the edge directed towards it.

Pivot node: The from-node of the edge connected to a parent sub-graph in order to generate its child sub-graph.

Target node: The to-node of the edge connected to a parent sub-graph in order to generate its child sub-graph. May be a node that already exists in the parent sub-graph, or a new node.

k-generation of patterns: The set of all candidate sub-graph patterns that have the same size k.

Instance of a sub-graph pattern g: Mapping between the nodes and edges of g and a set of nodes and edges of an EFG G of DS.

Instances(g, G): List of instances of a sub-graph pattern g that appear in EFG G of DS.

InitialAttributeList: List of distinct attributes that the method user is interested in, and that will be used to create the 0-generation of sub-graph patterns.

CurrentAttributeList: List of distinct attributes that appear in the sub-graph patterns of the k-generation of sub-graphs, and that will be used to create the (k+1)-generation of sub-graphs, with k>=0.

OutputSet: Set of frequent sub-graph patterns found by the presented method.

Q: A data structure, preferably a queue, that holds all frequent sub-graph patterns that must still be extended.

H: A data structure, preferably a hash-table, that holds the string representation of all frequent sub-graph patterns and is used to look up whether a pattern has already been mined for.

C: A set of child sub-graph patterns.

Execution Flow Graph: A graph formed by nodes and edges. Weights may be associated with each node and each edge, sets of attributes may be associated to each node, and a value may be associated with each attribute associated with a node. FIG. 2 is exemplary of a node and an edge of an Execution Flow Graph showing all their forming elements.

What is claimed is:

1. An apparatus comprising:
   at least one processor; and
   memory having instructions stored thereon that, when executed by the at least one processor, cause the apparatus to:
   construct an execution flow graph (EFG) representative of an execution of a computer program,
   mine for 0-edge sub-graph patterns in the EFG that have support values that exceed a threshold,
   insert the 0-edge sub-graph patterns and respective instances of the 0-edge sub-graph patterns into a first data structure and a second data structure,
   insert a string representation of the 0-edge sub-graph patterns into a third data structure;
   output a pattern and an identification of wherein a dataset of one or more instances of the pattern is located in connection with the computer program from the first data structure based on determining that the second data structure is empty.

2. The apparatus of claim 1, wherein the instructions, when executed by the at least one processor, cause the apparatus to:
   remove a sub-graph pattern from the second data structure,
   extend the sub-graph pattern removed from the second data structure to generate at least one child sub-graph pattern, and
   store the at least one child sub-graph pattern in the second data structure,
   wherein the removing, extending, and storing are performed in an iterative manner until said second data structure is empty.

3. The apparatus of claim 1, wherein the computer program is associated with a program execution profile that is flat.

* * * * *